Patented Oct. 5, 1943

2,331,273

UNITED STATES PATENT OFFICE 2,331,273

POLYSTYRENE RESINOUS COMPOSITION

Robert D. Lowry, Midland, Mich., assignor to The Dow Chemical Company, Midland, Mich., a corporation of Michigan No Drawing. Application April 14, 1939, Serial No. 267,924

8 Claims. (Cl. 260—91)

This invention relates to improved resinous compositions consisting essentially of a polymerized vinyl aromatic compound, and to a method of preparing the same.

When styrene is subjected to polymerizing conditions, absolutely complete polymerization is never achieved even though the monomeric styrene is entirely free of impurities and the polymerization is carried out under drastic conditions and for very long periods of time. Instead an equilibrium is reached and it is invariably found that a minor proportion, e. g. .2 to 8 per cent, of unpolymerized material remains dissolved in the polystyrene mass. The presence of this unpolymerized material, which consists chiefly of unchanged monomeric styrene and impurities originally present in the monomer, has recently been shown to have a detrimental effect on certain of the physical properties of the polystyrene. With this in mind, a number of workers have developed methods for removing the unpolymerized material from ordinary polystyrene, usually by heating the latter at elevated temperatures or by a suitable extraction.

These workers have reported that polystyrene from which the volatilizable or unpolymerized impurities have been removed is superior to ordinary polymerized styrene from the standpoint of light-stability, heat-stability, resistance to aging, and hardness. I have confirmed their findings in regard to these latter properties, but have also noted that with respect to certain other properties, viz. toughness and impact strength, the volatile-free polystyrene is rarely better than, and frequently inferior to, ordinary polymerized styrene. That is, the removal of the volatile unpolymerized material from polymerized styrene, although highly advantageous as regards light-stability and age-resistance, is often disadvantageous in its effect on the toughness and strength of the resulting product.

In view of these opposing tendencies, it is an object of the present invention to provide a resinous composition having both the desirable properties of substantially volatile-free polystyrene and at the same time exceptional toughness and strength.

According to the invention, ordinary polymerized styrene is treated to remove substantially all the volatilizable unpolymerized material therefrom, i. e. so that the volatile content of the polystyrene is less than about 1 per cent by weight, and the volatile material thus removed is replaced with a small proportion of a substantially non-volatile toughening agent as hereinafter explained. The resinous composition thus obtained is similar in most respects to polystyrene, but has a greater light-stability, heat-stability, age-resistance, and hardness, and at the same time a greater toughness and strength, than polymerized styrene as ordinarily prepared. The new product may be fabricated into useful objects by compression- or injection-molding, may be compounded into synthetic plastic materials of all sorts, and may be employed as an ingredient in coating compositions in a manner altogether similar to polystyrene.

In making the new product, ordinary resinous polymerized styrene prepared by any of a wide variety of known polymerization procedures, and preferably having an average molecular weight of at least 50,000, is first treated to remove substantially all the unpolymerized material therefrom. This treatment may be carried out by subjecting the polymerized styrene in granulated form to drying in a vacuum, e. g. at 1 inch of mercury absolute pressure or less, at elevated temperature, e. g. 125°–200° C., according to the known methods, or by passing a current of an inert gas into contact with the polystyrene at a temperature of at least 135° C. Alternatively, the polystyrene may be dissolved in hot benzene and the solution poured into alcohol, whereby the polystyrene is precipitated in a purified state.

In order to prepare the superior compositions of the invention, removal of volatilizable unpolymerized material from the polystyrene must be so conducted that after treatment less than about 1 per cent by weight of volatilizable material, and preferably less than 0.5 per cent, remains in the polystyrene. The per cent of volatilizable material as referred to herein is determined by dissolving a weighed quantity of the polystyrene in hot methyl ethyl ketone, evaporating the solution to dryness, and heating the residue to constant weight at a temperature of 140° C. at an absolute pressure of less than 1 inch of mercury; the loss in weight is a measure of the volatilizable content of the polystyrene.

After the volatilizable material in the polystyrene has been reduced to less than about 1 per cent, as just described, the resulting polystyrene is intimately mixed with a small proportion of a substantially non-volatile toughening agent. This latter substance serves to replace the volatilizable material which has been removed from the polystyrene and thereby restores the toughness and strength characteristics which were lost during such removal. However, the added toughening agent, being substantially non-volatile, does not detract from the light-stability, heat-stability, age-resistance, or hardness of the volatile-free polystyrene. There is accordingly obtained a resinous product having the superior properties of volatile-free polystyrene, and at the same time having desirable toughness and strength. This effect is augmented to an exceptional degree in the case of certain specific toughening agents hereinafter disclosed, by the use of which it is possible to prepare resinous compositions having properties distinctly superior to those of polystyrene plastic compositions as heretofore prepared.

In so far as I have been able to determine, any organic compound inert to and compatible with polystyrene and having a normal boiling point above 250° C. has definite value as a toughening agent according to the invention. Inert compatible organic compounds which boil above 300° C. and at the same time have a melting point below 160° C. are much easier to mix intimately with the volatile-free polystyrene, and are accordingly to be preferred. In particular, however, I have found that markedly superior effects are obtained when the toughening agent is an aromatic compound which is inert to and compatible with polystyrene, and has a melting point below 160° C., a normal boiling point above 300° C., and contains in the molecule no atoms other than carbon, hydrogen, oxygen, and halogen, especially when such compound is an ether or ester containing at least two benzene nuclei in the molecule. Examples of the toughening agents which I may employ are: polychloro-diphenyls, polychloro-diphenyl oxides, phenyl naphthyl ether, dixylyl ethane, di-(diphenyloxy) ethane, tristyrol, tetra-styrol, glyceryl dibenzyl ether, glycol di-(para-tertiary butyl phenoxy acetate), ethyl lactate salicylate, the 2 chloro-phenoxy acetic acid ester of ethylene glycol monoethyl ether, etc. It will be noted that many of the compounds named are of the type ordinarily employed in large proportion as "plasticizers" for synthetic resins. However, the present invention is not directed to the use of "plasticizers" and it is to be understood that the toughening agents of my invention do not actually exert any appreciable plasticizing action at all, i. e. they do not affect to any degree the plasticity or flow characteristics of the polystyrene.

The exact proportion of toughening agent added to the substantially volatile-free polystyrene according to the invention depends upon the particular agent employed, but is always small in comparison to the polystyrene. Preferably the toughening agent is added in a quantity just sufficient to replace the volatilizable material removed from the original polymerized styrene. Accordingly, not less than about 0.1 per cent and not more than 3 per cent by weight is ordinarily used. If too large a proportion, e. g. 5 to 10 per cent, is employed, the properties of the resulting material are distinctly inferior to those of my new products.

The toughening agent may be incorporated in the volatile-free polystyrene in any of a variety of methods adapted to produce an intimate admixture of the two materials. Thus, it is usually convenient to effect the addition in a kneading machine, such as a Banbury mixer, or on masticating rolls. However, it is satisfactory to dissolve both the polystyrene and toughening agent in a mutual solvent and then evaporate the latter. Again the toughening agent may be sprayed as a liquid onto the polystyrene in finely-divided form.

Although, in the foregoing description it has been assumed that my new product is prepared by first treating ordinary polymerized styrene to remove the volatilizable material to a proportion of less than about 1 per cent, and thereafter adding a small proportion of a toughening agent, it is equally possible to carry out these operations in reverse order or simultaneously. Thus, ordinary polystyrene may first be mixed with the desired proportion of toughening agent and then treated by any of the methods discussed to remove the volatilizable material. Again, the toughening agent may be mixed with monomeric styrene, and the mixture polymerized and then treated to remove the volatilizable material present. Other methods of addition will doubtless occur to one skilled in the art.

For simplicity, the preceding discussion has been limited to a method of improving the physical properties of ordinary polymerized styrene and to the products obtained thereby. However, it is to be understood that the same principles and procedure are equally applicable to improving the properties of any polymerizable vinyl aromatic compound, e. g. para-ethyl styrene, para-chloro styrene, vinyl naphthalene, etc.

The following examples will illustrate the invention but are not to be construed as limiting its scope:

*Example 1.*—Monomeric styrene of about 95 per cent purity, derived from the pyrolysis of ethyl benzene, was polymerized by heating at a gradually increasing temperature of 60° C. to 140° C. for 35 days, the product so obtained having an average molecular weight of 179,000, and containing 7 per cent of volatilizable material. This product was ground to a powder and a small proportion thereof was compression molded at a temperature of 114° C. into a suitable test specimen which was examined as hereinafter explained (I of Table A). The ground polymerized styrene was charged into a tower, and steam at a temperature of 150° C. was passed through the tower for 18 hours. The resulting polystyrene was found to contain only 0.10 per cent of volatilizable material. A small portion was molded into a test specimen at a temperature of 142° C. (II Table A). This substantially volatile-free polystyrene was then divided into portions which were kneaded for 3 minutes each with different small proportions of a toughening agent, viz. glycol di-(para-tertiary butyl phenoxy acetate) in a Banbury mixer at a temperature of 150°–160° C. Each of the resulting resinous products was molded into a test specimen at a temperature of 135° C. (III–VI.)

All the molded specimens thus obtained were tested for light-stability, heat-stability (similar to A. S. T. M. D 48–37), hardness (Rockwell superficial), impact strength (similar to A. S. T. M. D 256–34T), and tensile strength. The results of these tests are shown in the accompany Table A.

*Example 2.*—Samples of the granular polystyrene containing only 0.10 per cent of volatilizable material as prepared in the preceding example were mixed in a Banbury mixer at 160° C. with various proportions of a toughening agent, viz. phenyl naphthyl ether. The resulting resinous product was molded into test specimens (VII to IX) at a temperature of 135° C. and the molded pieces were tested as in Example 1. The results are shown in Table A.

Table A

| Sample | Per cent toughening agent | Impact strength (inch-pounds) | Tensile strength (lbs. per sq. in.) | Heat stability °C. | Rockwell hardness | Light stability |
|---|---|---|---|---|---|---|
| POLYMERIZED STYRENE | | | | | | |
| I | 0 | 0.9 | 6,000 | 67 | 15X-84 | Poor. |
| VOLATILE-FREE POLYMERIZED STYRENE | | | | | | |
| II | 0 | 1.2 | 7,900 | 91 | 15X-88 | Good. |
| GLYCOL DI(PARA-TERTIARY BUTYL PHENOXY ACETATE) ADDED | | | | | | |
| III | 0.5 | 2.4 | 8,700 | 91 | 15X-91 | Good. |
| IV | 1.0 | 1.8 | 8,200 | 86 | -90 | Do. |
| V | 2.0 | 1.7 | 9,100 | 89 | -91 | Do. |
| VI | 3.0 | 2.1 | 10,100 | 86 | -92 | Do. |
| PHENYL NAPHTHYL ETHER ADDED | | | | | | |
| VII | 0.5 | 1.3 | 7,100 | 83 | 15X-90 | Do. |
| VIII | 1.0 | 1.2 | 8,500 | 87 | -91 | Do. |
| IX | 2.0 | 1.7 | 10,300 | 82 | -90 | Do. |

Other modes of applying the principle of the invention may be employed instead of those explained, provided the product or method stated in any of the following claims or the equivalent of such stated product or method be employed.

I claim:

1. An improved resinous composition consisting essentially of a polymerized vinyl aromatic compound containing not more than about 1 per cent by weight of the volatilizable unpolymerized material normally present in said polymerized compound and containing between about 0.1 and about 3 per cent of a stable organic compound inert to and compatible with said polymerized vinyl aromatic compound and having a boiling point above 250° C.

2. An improved resinous composition consisting essentially of polystyrene containing not more than about 1 per cent by weight of the volatilizable unpolymerized material normally present in polymerized styrene and containing between about 0.1 and about 3 per cent of a stable organic compound inert to and compatible with polystyrene and having a boiling point above 250° C.

3. An improved resinous composition consisting essentially of polystyrene containing not more than about 1 per cent by weight of the volatilizable unpolymerized material normally present in polymerized styrene and containing between about 0.1 and about 3 per cent of a stable organic compound inert to and compatible with polystyrene and having a boiling point above 300° C. and a melting point below 160° C.

4. An improved resinous composition consisting essentially of polystyrene containing not more than about 1.0 per cent by weight of the volatilizable unpolymerized material normally present in polymerized styrene and containing between about 0.1 and about 3 per cent of a stable aromatic compound inert to and compatible with polystyrene and having a boiling point above 300° C. and a melting point below 160° C., containing in the molecule no atoms other than carbon, hydrogen, oxygen, and halogen, and being an ether having at least two phenyl nuclei in the molecule.

5. An improved resinous composition consisting essentially of polystyrene containing not more than about 0.5 per cent by weight of the volatilizable unpolymerized material normally present in polymerized styrene and containing between 0.1 and about 3 per cent by weight of glycol di-(para-tertiary butyl phenoxy acetate).

6. An improved resinous composition consisting essentially of polystyrene containing not more than about 0.5 per cent by weight of the volatilizable unpolymerized material normally present in polymerized styrene and containing between 0.1 and about 3 per cent by weight of phenyl naphthyl ether.

7. A resinous composition consisting essentially of polymerized styrene in which the small proportion of volatilizable unpolymerized material ordinarily present in said polymer has been substantially all removed to a proportion of less than 1 per cent by weight and replaced with between 0.1 and 3 per cent of a stable aromatic compound inert to and compatible with polystyrene and having a boiling point above 300° C. and a melting point below 160° C., containing in the molecule no atoms other than carbon, hydrogen, oxygen and halogen, and being an ester having at least 2 phenyl nuclei in the molecule.

8. A resinous composition consisting essentially of polymerized styrene in which the small proportion of volatilizable unpolymerized material ordinarily present in said polymer has been substantially all removed to a proportion of less than 1 per cent by weight and replaced with between 0.1 and 3 per cent of a stable aromatic compound inert to and compatible with polystyrene and having a boiling point above 300° C. and a melting point below 160° C., containing in the molecule no atoms other than carbon, hydrogen, oxygen and halogen.

ROBERT D. LOWRY.